(12) United States Patent
Hosoe

(10) Patent No.: US 8,778,113 B2
(45) Date of Patent: Jul. 15, 2014

(54) METHOD FOR CONTINUOUSLY FORMING LAMINATION OPTICAL FUNCTION ELEMENT SHEET AND LAMINATION OPTICAL FUNCTION ELEMENT SHEET FORMING APPARATUS

(75) Inventor: Shigeru Hosoe, Hino (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 9 days.

(21) Appl. No.: 13/574,748

(22) PCT Filed: Jan. 24, 2011

(86) PCT No.: PCT/JP2011/051181
§ 371 (c)(1),
(2), (4) Date: Jul. 23, 2012

(87) PCT Pub. No.: WO2011/090186
PCT Pub. Date: Jul. 28, 2011

(65) Prior Publication Data
US 2012/0312457 A1    Dec. 13, 2012

(30) Foreign Application Priority Data

Jan. 25, 2010 (JP) ................................. 2010-012932
Feb. 3, 2010 (JP) ................................. 2010-022013

(51) Int. Cl.
*B32B 37/24* (2006.01)
(52) U.S. Cl.
USPC ...................................................... 156/182
(58) Field of Classification Search
USPC ........ 156/182, 242, 246, 272.2, 275.5, 307.1, 156/379.6, 387, 500, 380.9, 378
See application file for complete search history.

(56) References Cited

U.S. PATENT DOCUMENTS

| 6,325,880 | B1 * | 12/2001 | Yamashita et al. ............ 156/209 |
| 7,462,305 | B2 | 12/2008 | Honda |
| 2006/0062969 | A1 * | 3/2006 | Honda ........................ 428/172 |

FOREIGN PATENT DOCUMENTS

| JP | 10-221782 | 8/1998 |
| JP | 2005-7873 | 1/2005 |
| JP | 2007-264184 | 10/2007 |
| JP | 2008-298962 | 12/2008 |
| JP | 2009-292060 | 12/2009 |

* cited by examiner

*Primary Examiner* — Daniel McNally
(74) *Attorney, Agent, or Firm* — Cozen O'Connor

(57) ABSTRACT

Provided are a method and an apparatus for continuously forming a laminated optical function element sheet which has optical function elements formed on three or more faces by laminating a first optical function element sheet which has an optical function element formed on both of the front and back faces with a second optical function element sheet which has an optical function element formed on at least one of the two faces. The method comprises a first optical function element sheet forming step of molding, forming, or printing an optical function element on both of the front and back faces of a first base film, a second optical function element sheet forming step of molding, forming or printing an optical function element on at least one of the two faces of a second base film, and a laminating and bonding step of simultaneously performing the first and second optical function element sheet forming steps to laminate and bond the formed first and second optical function element sheets and form a laminated optical function element sheet.

21 Claims, 8 Drawing Sheets

METHOD FOR CONTINUOUSLY FORMING LAMINATION OPTICAL FUNCTION ELEMENT SHEET AND LAMINATION OPTICAL FUNCTION ELEMENT SHEET FORMING APPARATUS

RELATED APPLICATIONS

This application is a U.S. National Phase Application under 35 USC 371 of International Application PCT/JP2011/051181 filed Jan. 24, 2011.

This application claims the priority of Japanese application No. 2010-012932 filed Jan. 25, 2010 and JP 2010-022013 filed Feb. 3, 2010, the entire content of both of which are hereby incorporated by reference.

TECHNICAL FIELD

The present invention relates to a continuously forming method which forms a plurality of optical function element sheets on each of which a plurality of optical function elements are sequentially continuously formed on both obverse and reverse surfaces or one surface of a base film and laminates the plurality of optical function element sheets so as to form a lamination optical function element sheet, and to a lamination optical function element sheet forming apparatus.

BACKGROUND ART

The optical function element in the present invention means an optical member such as an optical element, and an optical member which is used in association with an light emitting element such as LED and has optical functions. Examples of these optical members include optical elements such as a lens, a prism, a mirror element, a diffractive element, a diffractive mirror, a grism, a lenticular sheet, a lens sheet, and a microlens array; and auxiliary members, such as a diaphragm which assists the optical function of an optical element and a light emitting element, a spacer at the time of actual installation, a protrusion for fitting, and a black ink for light shielding. The present invention is configured to form these optical function elements on a plurality of base films, and to laminate them, and a formed product is called an optical function element sheet.

The optical function elements formed on both surfaces of a base film may be not the same kind of optical function element. For example, lenses may be formed on one surface, and diaphragms may be formed on another surface. Further, as with a lens, in the case of optical function elements which are used by being separated individually, a fitting section for position alignment is formed on each of optical function element producing surfaces which are brought in close contact with each other. Then, at the time of lamination, respective optical axes of optical elements to be laminated are aligned by use of the fitting sections. Furthermore, in at least one of optical function element sheets to be laminated, optical function elements are formed on both obverse and reverse surfaces. However, in another optical function element sheet, optical function elements may be formed on only one surface.

Optical function elements, such as a lens, are formed in the form of matrix on a lamination optical function element sheet, separated individually after completion of formation, and used as individual optical function elements. On the other hand, a lenticular sheet is not individually divided on an optical function element sheet. However, after completion of formation, since the lenticular sheet is used by being cut out in a predetermined size, such a lenticular sheet is included in the present invention as an optical function element sheet to form a plurality of optical function elements.

In the present invention, such optical function elements are sequentially formed on both surfaces or on surface of a plurality of base films, and the plurality of base films are laminated. Here, the forming method of optical function elements includes "shape forming", "molding" and "printing", these methods are collectively called "forming". The "shape forming" is a process to soften a solid state material to be shaped with heat and press, to bring the softened material in close contact with a transfer surface of a die, and to transfer the shape onto the material. The "molding" is a process to pour a liquid state material to be shaped in a mold, and to cure the material by heating or irradiation of UV light so as to transfer the shape onto the material. Further, "printing" means a process to make a printed material (ink) adhere to a rolled plate die, and to transfer this printed material onto a base film.

Such an optical function element sheet forming method can form a lot of optical function elements continuously. Accordingly, in recent years, this methods becomes to be employed for formation of various optical function elements, such as lenses for fill light, i.e., flash light for cellular phones and digital cameras; diffusion lenses of LED illumination; and lens sheets for back light of a liquid crystal display.

As a method for forming an optical function element sheet, Patent document 1 discloses a method for continuously forming lens sheets, specifically, prism sheets, lenticular lens sheets, and Fresnel lens sheets on one surface of a base film by die-transferring an energy ray curable resin via a roll die; and specifically discloses a forming method to eliminate warpage of a lens sheet by temperature control before curing and during curing.

Patent Document 2 discloses a method of forming a transmission type rear screen by steps of coating ultraviolet curable resin to one surface of a base film; introducing and pressing this film between a lenticular lens array forming roll die and a pressure roll; forming a lenticular lens array by curing the ultraviolet curable resin with UV irradiation; subsequently, coating the second ultraviolet curable resin on another surface of the base film; introducing and pressing this film between a convex portion forming roll die and a pressure roll; forming convex portions by curing the second ultraviolet curable resin with UV irradiation, and coating a light shielding ink on the respective apexes of the convex portions.

Further, Patent Document 2 proposes a technique to provide an alignment mark forming die at margin portions of a lenticular lens array forming roll die so as to form alignment marks simultaneously at the time of formation of a lenticular lens array, meanwhile, to form the similar alignment marks on a convex portion forming roll die, and to conduct position alignment for optical elements formed on both surface of a sheet by aligning the alignment marks on the convex portion forming roll die with the alignment marks formed on the resin layer.

RELATED ART DOCUMENT

Patent Document

Patent Document 1: Japanese Unexamined Patent Application Publication No. 2009-292060 Official Report
Patent Document 2: Japanese Unexamined Patent Application Publication No. 2007-264184 Official Report

OUTLINE OF THE INVENTION

Problems to be Solved by the Invention

The technique of Patent Document 1 forms optical function elements on one surface of a base film, and Patent Document 2 forms optical function elements on both surfaces of a base film. However, none of them can form lamination optical function elements almost simultaneously on three surfaces or more by using two sheets of base film.

The present invention forms optical function elements on the obverse surface of a first base film, successively forms optical function elements on an obverse surface on the reverse surface, thereby forming a first optical function element sheet, and meanwhile, forms optical function elements on at least one surface of a second base film, thereby forming a second optical function element sheet Then, the first optical function element sheet and the second optical function element sheet are laminated so as to form a lamination optical function element sheet. Accordingly, the present invention has an object to provide a method for continuously forming such a lamination optical function element sheet, and a lamination optical function element sheet forming apparatus.

Further, at the time of formation of optical function elements on obverse and reverse surfaces of a base film, and also at the time of lamination of optical function element sheets, in the case where a cut-out optical function element is required to exhibit an optical function as a single component such as a lens, a technique to align respective positions of optical function element becomes important.

The positioning technique of Patent Document 2 is not, because description is not made specifically. However, it is assumed that the rotation phase of the convex portion forming roll die is adjusted such that the alignment marks on the convex portion forming roll die are made to conform to the alignment marks formed on the resin layer, and it is supposed that this adjustment is conducted at the early stage of formation.

However, when optical function elements are formed on another surface in succession to formation of optical function elements on one surface of a base film, if temperature change take place between these processed, expansion or contraction may occur in the longitudinal direction. As a result, longitudinal misalignment may take place at the time of formation of optical function elements on another surface. Optical function elements are formed on a base film while conveying continuously the base film. Accordingly, since changes in a length of the base film may be accumulated, if no counter measure is taken, the longitudinal misalignment becomes a large value.

For example, in the case where a sheet material is polyethylene terephthalate (PET), a coefficient of linear expansion is about 70 ppm/° C. Accordingly, if the temperature is changed by 1° C. between the transfer formation on one surface and the transfer formation on another surface, the length may change by 70 μm per 1 m. On this condition, after the film base is conveyed by 100 m, the change in length is accumulated to 7 nm. Accordingly, misalignment between one surface and another surface becomes too lager to use as a product.

In the case where a sheet material is an alkali free glass with a thickness of about 100 μm, a coefficient of linear expansion is as small as about 3 ppm/° C. However, when the film base is conveyed by 100 m on the same condition, an amount of longitudinal misalignment becomes 300 μm which is not an allowable value as an amount of eccentricity between the obverse and reverse surfaces.

The present invention has an object to provide a method for continuously forming a lamination optical function element sheet and a lamination optical function element sheet forming apparatus which can correct surely misalignment of optical function elements formed at the time of formation of optical function elements on obverse and reverse surfaces and lamination sheets so as to form optical function elements having no eccentricity.

Means for Solving the Problems

The above object can be attained by the following methods and apparatus.
1. A method for continuously forming a lamination optical function element sheet, is characterized by forming a lamination optical function element sheet by comprising:

a first optical function element sheet forming process for molding shape-forming or printing optical function elements on one surface of a first base film by use of a first roll die, and molding, forming or printing optical function elements on another surface by use of a second roll die;

a second optical function element sheet forming process for molding, shape-forming or printing optical function elements on at least one surface of a second base film by use of a third roll die; and a lamination bonding process for performing simultaneously the first optical function element sheet forming process and the second optical function element sheet forming process, and laminating and bonding the formed first optical function element sheet and the formed second optical function element sheet.

2. The method for continuously forming a lamination optical function element sheet, described in Item 1 and characterized in that contact portions which come in contact with each other at the time of lamination of the first optical function element sheet and the second optical function element sheet are fitting-portions formed on respective outer peripheries of the optical functional element, and the fitting-portions are made into one body at the time of formation of the optical functional element.

3. The method for continuously forming a lamination optical function element sheet, described in Item 1 and characterized in that contact portions which come in contact with each other at the time of lamination of the first optical function element sheet and the second optical function element sheet are fitting-portions each formed by annular protrusion, and the fitting-portions are fit to each other such that an inner side of one of the fitting-portions is fit to an outer side of the other one.

4. The method for continuously forming a lamination optical function element sheet, described in any one of Items 1 to 3 and characterized in that formation of optical function elements onto one surface or another surface of the first base film or at least one surface of the second base film is performed such that ultraviolet curable resin is supplied to a roll die and the ultraviolet curable resin is cured by ultraviolet 5. The method for continuously forming a lamination optical function element sheet, described in any one of Items 1 to 3 and characterized in that formation of optical function elements onto one surface or another surface of the first base film or at least one surface of the second base film is performed such that heat curable resin is supplied to a roll die and the ultraviolet curable resin is cured by heating.

6. The method for continuously forming a lamination optical function element sheet, described in Item 4 or 5 and characterized in that bonding of the first optical function element sheet and the second optical function element sheet is performed such that the formed optical function elements are laminated in a semi-cured state, and then curing is completed.

7. The method for continuously forming a lamination optical function element sheet, described in any one of Items 1 to 3 and characterized in that an ultraviolet curable resin used for formation of optical function elements includes a blended compound of a photo-polymerization initiator and a thermal polymerization initiator, wherein the ultraviolet curable resin is made in a semi-cured state by irradiation of ultraviolet, and is finally cured by heating at the time of lamination bonding.

8. The method for continuously forming a lamination optical function element sheet, described in any one of Items 1 to 3 and characterized in that as an ultraviolet curable resin used for formation of optical function elements, a delayed-curing type ultraviolet curable resin is used.

9. The method for continuously forming a lamination optical function element sheet, described in any one of Items 1 to 8 and characterized in that the first roll die and the third roll die each includes a die section to form a position detection mark, and alignment between optical function elements formed on one surface and another surface of the first base film is performed by detecting the position detection mark formed by the first roll die, and alignment between the optical function elements formed on the first base film and the optical function elements formed on the second base film is performed by detecting the position detection mark formed by the first roll die and the position detection mark formed by the third roll die.

10. A lamination optical function element sheet forming apparatus, characterized by comprising:
    a first base film supplying section;
    a first optical function element forming section for molding, forming or printing a plurality of optical function elements on one surface of a first base film supplied from the first base film supplying section by use of a first roll die having dies of multiple optical function elements;
    a second optical function element forming section for forming a first optical function element sheet by molding, forming or printing a plurality of optical function elements on another surface of the first base film supplied from the first base film supplying section by use of a second roll die having dies of multiple optical function elements;
    a second base film supplying section;
    a third optical function element forming section for forming a second optical function element sheet by molding, forming or printing a plurality of optical function elements on one surface of a second base film supplied from the second base film supplying section by use of a third roll die having dies of multiple optical function elements; and
    a lamination bonding section for forming a lamination optical function element sheet by laminating and bonding the first optical function element sheet on obverse and reverse surfaces of which optical function elements are formed by the first optical function element forming section and the second optical function element forming section and the second optical function element sheet on which optical function elements are formed by the third optical function element forming section.

11. The lamination optical function element sheet forming apparatus described in Item 10 and characterized in that contact portions which come in contact with each other at the time of lamination of the first optical function element sheet and the second optical function element sheet are fitting-portions formed on respective outer peripheries of the optical functional element, and the fitting-portions are formed integrally with the optical functional element.

12. The lamination optical function element sheet forming apparatus described in Item 10 and characterized in that contact portions which come in contact with each other at the time of lamination of the first optical function element sheet and the second optical function element sheet are fitting-portions each formed by annular protrusion, and the fitting-portions are fit to each other such that an inner side of one of the fitting-portions is fit to an outer side of the other one.

13. The lamination optical function element sheet forming apparatus described in any one of Items 10 to 12 and characterized in that the first optical function element forming section, the second optical function element forming section, or the third optical function element forming section supplies ultraviolet curable resin to the first roll die, the second roll die or the third roll die, and cures the ultraviolet curable resin with ultraviolet.

14. The lamination optical function element sheet forming apparatus described in any one of Items 10 to 12 and characterized in that formation of optical function elements onto one surface or another surface of the first base film or at least one surface of the second base film is performed such that heat curable resin is supplied to a roll die and the ultraviolet curable resin is cured by heating.

15. The lamination optical function element sheet forming apparatus described in Item 13 or 14 and characterized in that bonding of the first optical function element sheet and the second optical function element sheet is performed such that the formed optical function elements are laminated in a semi-cured state, and then curing is completed.

16. The lamination optical function element sheet forming apparatus described in any one of Items 10 to 15 and characterized in that the first roll die and the third roll die each includes a die section to form a position detection mark, and alignment between optical function elements formed on one surface and another surface of the first base film is performed by detecting the position detection mark formed by the first roll die, and alignment between the optical function elements formed on the first base film and the optical function elements formed on the second base film is performed by detecting the position detection mark formed by the first roll die and the position detection mark formed by the third roll die.

17. The lamination optical function element sheet forming apparatus described in Item 10 and characterized in that in at least one of the first roll die, the second roll die, and the third roll die, a transfer surface is formed on a cylindrical roll surface which becomes a base material with ultraviolet curable resin or a heat curable resin.

Effect of the Invention

According to the present invention mentioned above, optical function elements are formed on an obverse surface of a first base film, successively optical function elements are formed on an reverse surface, thereby forming a first optical function element sheet; meanwhile optical function elements are formed on at least one surface of a second base film, thereby forming a second optical function element sheet; the first optical function element sheet and the second optical function element sheet are laminated so as to form a lamination optical function element sheet, whereby lamination optical function elements constituted in three planes or more can be formed.

EMBODIMENT FOR IMPLEMENTING THE INVENTION

Hereafter, the first embodiment of the present invention will be described with reference to drawings. FIG. 11 is a schematic diagram showing a lamination optical function element sheet forming apparatus of the first embodiment. Through rough view, this lamination optical function element sheet forming apparatus is configured to form a lamination optical function element sheet by a first optical function element sheet forming process for forming optical function elements on both obverse and reverse surfaces of a first base film FA, a second optical function element sheet forming process for forming optical function elements on both obverse and reverse surfaces of a second base film FB, and a lamination bonding process for laminating and bonding the first optical function element sheet and the second optical function element sheet formed by the above both processes. The first optical function element sheet forming process and the second optical function element sheet forming process are performed simultaneously so as to supply the respective optical function element sheets to the lamination bonding process.

Figure 1:
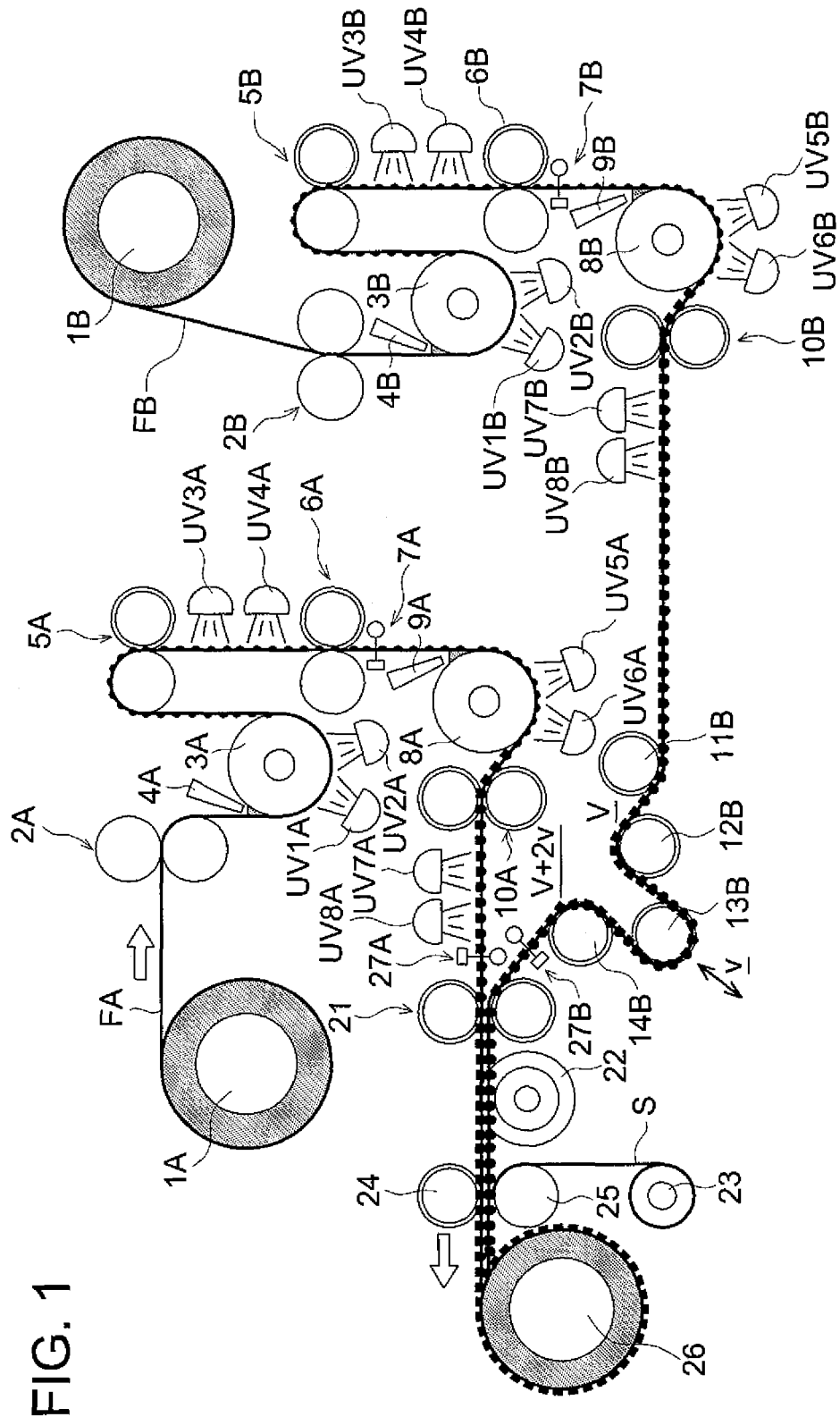
FIG. 1 is a schematic diagram showing a lamination optical function element sheet forming apparatus according to a first embodiment.

In FIG. 1, in the structure of the first optical function element sheet forming process, a conveying roller pair 2A, a first obverse surface molding roll die 3A, a ultraviolet curable resin supply section 4A to supply ultraviolet curable resin between the upstream side of the first obverse surface molding roll die 3A and a first base film FA, a conveying roller pair 5A, a conveying roller pair 6A, a mark detecting section 7A to detect a mark for alignment between obverse and reverse surfaces, a first reverse surface molding roll die 8A, a ultraviolet curable resin supply section 9A to supply ultraviolet curable resin between the upstream side of the first reverse surface molding roll die 8A and a base film FA, and a conveying roller pair 100A are arranged in this order on a conveyance passage of a first base film FA supplied from a first base film supply roller 1A.

Further, ultraviolet irradiation lamps UV1A and UV2A are arranged at respective positions opposite to the first obverse surface molding roll die 3A, and ultraviolet irradiation lamps UV3A and UV4A are arranged at respective positions opposite to a conveyance passage between the conveying roller pair 5A and the conveying roller pair 6A, such that ultraviolet curable resin supplied between the first obverse surface molding roll die 3A and the first base film FA is cured.

Similarly, in order to cure ultraviolet curable resin supplied between the first reverse surface molding roll die 8A and the first base film FA, ultraviolet irradiation lamps UV5A and UV6A are arranged at respective positions opposite to the first reverse surface molding roll die 8A, and ultraviolet irradiation lamps UV7A and UV8A are arranged at respective positions opposite to a conveyance passage located at the downstream side of the conveying roller pair 10A.

Further, similarly, in the structure of the second optical function element sheet forming process, a conveying roller pair 2B, a second obverse surface molding roll die 3B, a ultraviolet curable resin supply section 4B to supply ultraviolet curable resin between the upstream side of the second obverse surface molding roll die 3B and a second base film FB, a conveying roller pair 5B, a conveying roller pair 6B, a mark detecting section 7B to detect a mark for alignment between obverse and reverse surfaces, a second reverse surface molding roll die 8B, a ultraviolet curable resin supply section 9B to supply ultraviolet curable resin between the upstream side of the second reverse surface molding roll die 8B and a base film FB, and a conveying roller pair 10B are arranged in this order on a conveyance passage of a second base film FB supplied from a second base film supply roller 1B.

Furthermore, in order to cure ultraviolet curable resin supplied between the second reverse surface molding roll die 3B and the second base film FB, ultraviolet irradiation lamps UV1B and UV2B are arranged at respective positions opposite to the second obverse surface molding roll die 3B, and ultraviolet irradiation lamps UV3B and UV4B are arranged at respective positions opposite to a conveyance passage between the conveying roller pair 5B and the conveying roller pair 6B. In addition, in order to cure ultraviolet curable resin supplied between the second reverse surface molding roll die 8B and the second base film FB, ultraviolet irradiation lamps UV5B and UV6B are arranged at respective positions opposite to the second reverse surface molding roll die 8B, and ultraviolet irradiation lamps UV7B and UV8B are arranged at respective positions opposite to a conveyance passage located at the downstream side of the conveying roller pair 10B3.

At the more downstream side of ultraviolet irradiation lamps UV7B and UV8B, a conveying roller pair 11B, a conveying roller pair 12B configured to change a later-mentioned sheet speed, a position-changeable conveying roller pair 13B, and a conveying roller pair 14B are arranged so as to proceed in the downstream direction toward the lamination boding process.

A first optical function element sheet formed by the first optical function element sheet forming process and a second optical function element sheet formed by the second optical function element sheet forming process join with each other in the lamination bonding process, and are laminated and boded to each other.

A constitution of the lamination bonding process includes a conveying roller pair 21 to convey the first optical function element sheet and the second optical function element sheet which join with each other, a heating roller 22 which incorporates a heat source for completing bonding, and a conveying roller 24 and a backup roller 25 both to insert a spacer sheet S supplied from a spacer sheet supply roller 23 into a lamination optical function element sheet and to convey them. In the lamination bonding process, the lamination optical function element sheet is finally wound around a molded product roller 26.

Further, on the conveyance passage on which the first optical function element sheet and the second optical function element sheet join with each other in the lamination bonding process, disposed are a mark detecting section 27A to detect a mark for alignment of lamination and a mark detecting section 27B to detect a mark for alignment of lamination. The lamination alignment marks detected by the mark detecting sections 27A and 27B may be used additionally as marks for alignment of obverse and reverse surfaces. However, lamination alignment marks may be provided separately from marks for alignment of obverse and reverse surfaces. The alignment method will be described later.

On the respective peripheral surfaces of the above-mentioned obverse surface molding roll dies 3A and 3B and reverse surface molding roll dies 8A and 8B, molds each shaped in the form of optical function elements to be produced are arranged in a matrix form. In the respective insides of them, a heater is incorporated so as to control the temperature of an ultraviolet curable resin to become constant.

In FIG. 1, a roller at an optical function element forming side in each of the conveying roller pairs 5A, 5B, 6A, and 6B, each of conveying roller pairs 10A, 10B, and 21, and each of conveying rollers 11B, 12B, 13B, 14B, and 24 is configured to come in contact with formed optical function elements. Accordingly, a rubber roller configured not to damage the optical function elements may be used for such a roller. However, more preferable is a roller which does not come in contact with the optical function elements and comes in contact with portions between optical function elements.

Figure 2A:
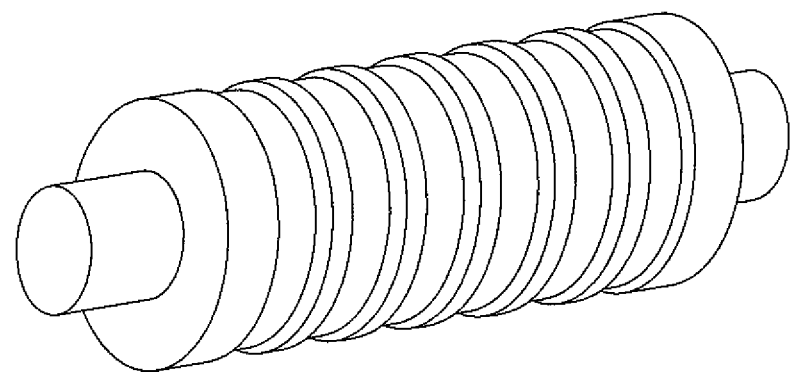
FIG. 2 is a perspective view showing a conveying roller used in the present invention.
Figure 2B:
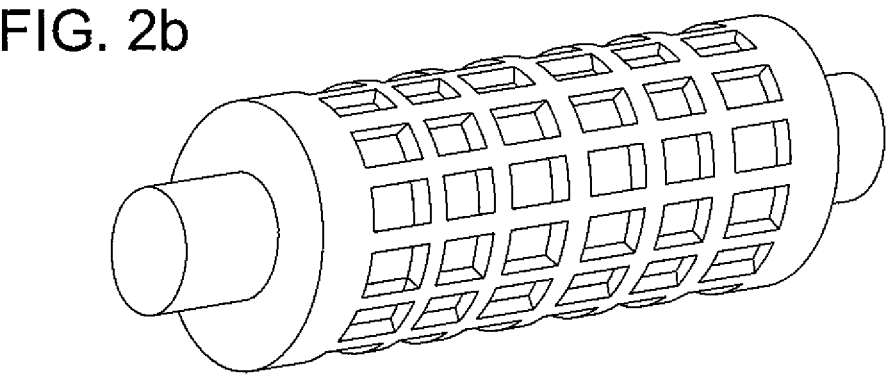

FIG. 2 shows such a roller, in particular, FIG. 2(*a*) shows a grooved roller configured such that grooves are formed in the circumferential direction and each of optical function element forming portions are adapted to enter one of the grooves, and FIG. 2(*b*) shows a recessed roller configured such that concaves each corresponding to a optical function element forming portion are formed in an matrix arrangement on a peripheral surface. In FIG. 1, one of the grooved roller and the recessed roller is employed for a conveying roller shown with a double circle.

Figure 3:
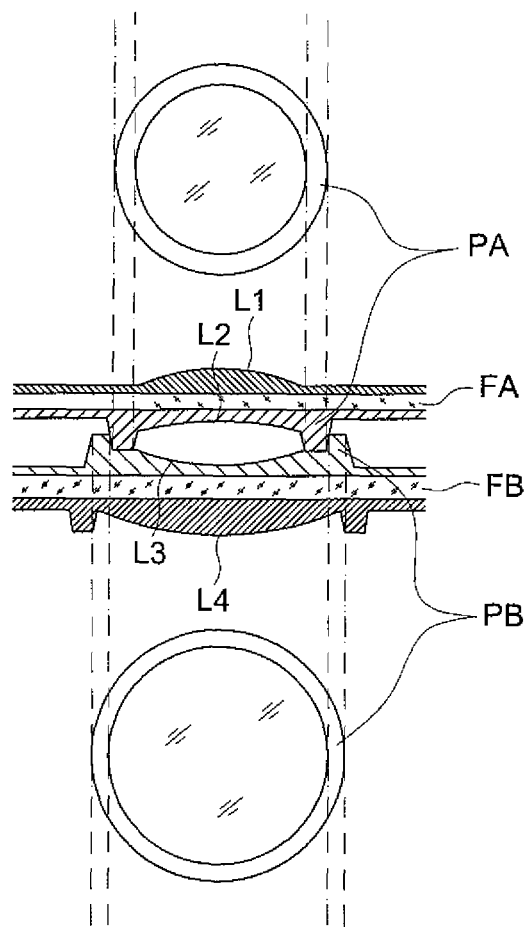
FIG. 3 is a schematic diagram showing lamination optical function elements formed in the first embodiment.

FIG. 3 is a schematic diagram showing one example of a lamination optical function element formed by the present invention, indicates a cross-section of a lamination lens being one example of a lamination optical function element at a central portion, and indicates the respective plan views of fitting portions for lamination bonding at upper and lower portions.

A lamination lens is structured such that a first lens L1 and a second lens L2 formed respectively on obverse and reverse surfaces of a first base film FA and a third lens L3 and a fourth lens L4 formed respectively on obverse and reverse surfaces of a second base film FB are laminated.

On the outer periphery of the second lens L2, formed is a fitting portion PA for lamination bonding, and also on the outer periphery of the third lens L3 which is brought in contact with and bonded to the second lens L2, formed is a fitting portion PB for lamination bonding. The diameter of the outer periphery of the fitting portion PA is made almost equal to the diameter of the inner periphery of the fitting portion PB. Accordingly, in the lamination bonding process, the fitting portion PA is fit exactly in the fitting portion PB, thereby forming a lamination optical function element in which respective optical axes are made to conform to each other.

As mentioned below, in order to align the respective positions of the first optical function element sheet and the second optical function element sheet, the sheet conveyance speed of the second optical function element sheet is adjusted. With this, the position of each of optical function elements on the both optical function element sheets is adjusted in several micron order, and then lastly, by fitting between the fitting portions PA and PB for lamination bonding, the first optical function element sheet and the second optical function element sheet are laminated correctly.

Optical function elements are formed respectively on an obverse surface side and a reverse surface side by the first optical function element sheet forming process and the second optical function element sheet forming process. In this case, the respective optical axes of the optical function elements are needed to conform to each other. For such alignment, a side portion of each of respective optical function element sheets formed by the obverse surface molding roll dies 3A and 3B, position alignment marks are formed simultaneously at the time of formation of optical function elements.

Figure 4:
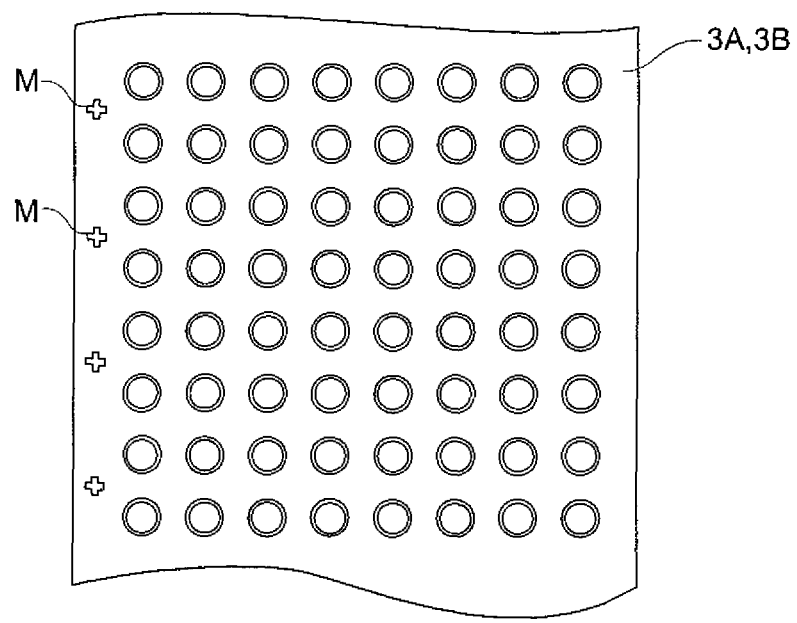
FIG. 4 is a schematic diagram showing a developed view of a roll die used in the present invention.

As shown in a developed view in FIG. 4, in the obverse surface molding roll dies 3A and 3B, molds to form optical function elements (lenses and fitting portions for lamination bonding in the roll dies 3A, lenses in the roll dies 3B) are arranged in a matrix form, and on a side portion of one of the obverse surface molding roll dies 3A and 3B, mark forming die sections M to form marks for alignment of positions are disposed. In the example shown in FIG. 2, the mark forming die section M is arranged for every two lines of dies. However, the mark forming die section M may be arranged for each line or every multiple lines. Further, in order to increase the reliability of detection or to check the situation of a base film in detail, the mark forming die section M may be arranged not only at one position in the roll width direction, but at multiple positions.

In FIG. 1, the obverse surface molding roll dies 3A and 3B and the reverse surface molding roll dies 8A and 8B are constituted to be driven separately by respective different driving sources. The driving source for the reverse surface molding roll dies 8A and 8B is controlled based on information of marks detected by the mark detecting section 7A and 7B in such a way that the rotation speed of the reverse surface molding roll dies 8A and 8B is controlled so as to make the position of each of the optical function elements at the obverse surface side to conform with the position of one of the optical function elements at the reverse surface side.

Here, the conveyance speed of each of the base films FA and FB is constant. Accordingly, if the rotation speed of the reverse surface molding roll dies 8A and 8B is changed, the reverse surface molding roll dies 8A and 8B are made to slip slightly relative to the base films FA and FB, so that the forming position of each of optical function elements is adjusted to a correct position. At this time, since an amount of slip is extremely small, it does not cause problems for formation of optical functional elements. In this regards, a control unit to perform this control is not illustrated. However, any known constitution of speed control may be employed.

The mark detecting sections 7A and 7B each are composed of a light source and a sensor. As described in a column of PROBLEMS TO BE SOLVED BY THE INVENTION, since a positional deviation is in micron order, the mark detecting sections 7A and 7B to be used are required to be able to detect marks with resolution of submicron order.

In the above-mentioned description, the roll dies are produced precisely so as not to have eccentricity of an axis and deviation of a roll configuration. However, it may be difficult to eliminate perfectly such eccentricity and deviation. The smaller an optical function element is, the greater the influences of eccentricity and deviation become. Then, the eccentricity of axis and the roll configuration are measured beforehand for each of the roll dies, and the resulting measurement values are stored. Subsequently, at the time of correction of speed, speed is corrected based on the stored measurement values of the eccentricity of axis and the roll configuration. At this time, the rotation position information of each of the reverse surface molding roll dies 8A and 8B becomes necessary. Accordingly, it is desirable that a mark is put on each of the reverse surface molding roll dies 8A and 8B and the rotation position is measured based on the mark, or that a rotary encoder is disposed on a shaft of each of the reverse surface molding roll dies 8A and 8B and the rotation position information is obtained by the rotary encoder.

Successively, description will be given for a method of aligning both optical function element sheets at the time of lamination of the first optical function element sheet and the second optical function element sheet. In FIG. 1, the alignment is performed such that the conveyance speed of the first optical function element sheet is kept constant and the conveyance speed of the second optical function element sheet is changed relative to that of the first optical function element sheet. In the constitution of FIG. 1, the change of the conveyance speed of the second optical function element sheet is performed by controlling the conveying roller 13B to be shifted based on the position information detected by the lamination alignment mark detecting sections 27A and 2713.

Namely, when the conveyance speed of the base film F at the upstream side of the conveying roller 12B is V, if the conveying roller 13B is moved in the positive or negative direction at a speed v, the conveyance speed of the base film F at the downstream side is made to V±2v. With this, the position of the second optical function element sheet can be corrected so as to conform to the position of the first optical function element sheet. In this regard, as the constitution to move and maintain the position of the conveying roller 13B so as to be changeable, any known constitution may be employed.

Next, description will be given for a method of forming a lamination optical function element sheet by use of the lamination optical function element sheet forming apparatus with the above-mentioned constitution.

In FIG. 1, on a state that the base films FA and FB and a spacer sheet S are supplied, the apparatus is operated such that a ultraviolet curable resin is supplied to each of the roll dies so as to form optical function elements. At this time, among the first optical function element sheet forming process and the second optical function element sheet forming process, at least a process of forming optical function elements which face to each other, curing of the ultraviolet curable resin is made to a semi-cured state. The semi-cured state is achieved by adjustment of an irradiation amount of an ultraviolet irradiation lamp.

An optical function element sheet in the semi-cured state is made to proceed to the lamination bonding process, and at the sage that both optical function element sheets are laminated, a heating roller 22 which incorporates a heat source therein, promotes curing so as to conduct finally-curing so that the both optical function element sheets are bonded by the finally-curing. As mentioned above, the both optical function element sheets have respective fitting portions for lamination bonding. Accordingly, the fitting portions are fit to each other, whereby the both optical function element sheets are aligned to each other. Further, the contact surfaces of the fitting portions are bonded to each other by the finally-curing.

In the above-mentioned description, the semi-cured state of the ultraviolet curable resin is achieved by the adjustment of an irradiation amount of an ultraviolet irradiation lamp. However, as another method, a delayed-curing type ultraviolet curable resin may be employed. In particular, since the conveying distance in the second optical function element sheet forming process is longer than that in the first optical function element sheet forming process, the delayed-curing type ultraviolet curable resin may be preferable. As such a curable resin, for example, a known resin is gradually cured by control of the reaction speed of cationic photopolymerization without curing immediately after irradiation of ultraviolet.

Further, a resin having both ultraviolet curing characteristic and heat curing characteristic may be employed such that the resin is semi-cured by irradiation of ultraviolet and finally-cured by heat, or semi-cured by heat and finally-cured by irradiation of ultraviolet. Generally, the curable resin is composed of monomer, oligomer, a polymerization initiator, and an additive agent. As the polymerization initiator, an ultraviolet polymerization initiator and a thermal polymerization initiator may be blended.

Further, as the curable resin, a heat curable resin may be employed. The heat curable resin may be made in a semi-cured state by setting a heating temperature at the time of formation to be slightly low relative to a normal heating temperature or by shortening a heating time relative to a normal heating time. Subsequently, after lamination of the heat curable resin in the semi-cured state, the heat curable resin is heated on the condition of finally-curing, thereby being bonded to another resin.

An ultraviolet curable resin as a material to form an optical function element may be appropriately selected in accordance with the performance of the optical function element from urethane acrylate, epoxy acrylate, unsaturated acid polyester, and the like. Examples of the heat curable resin include diethylene glycol diallyl carbonate, siloxanyl methacrylate, and the like. Further, energy ray curable resins, such as visible light and electron rays may be employed.

Further, as an ultraviolet irradiation lamp; a high pressure mercury lamp, a halide lamp, and the like may be used. In addition, an ultraviolet irradiation lamp of a LED type developed in recent years may be used also.

Although it is described in the above that the bonding of the both optical function element sheets may be performed by finally-curing of a curable resin, an adhesive agent may also be used together. For example, on the downstream side of the conveying roller pair 10A, a coater of a adhesive agent may be disposed at a side opposite to the ultraviolet irradiation lamps UV7A and UV8A such that the adhesive agent is coated on the top surface of the fitting portion for lamination bonding.

Figure 5:
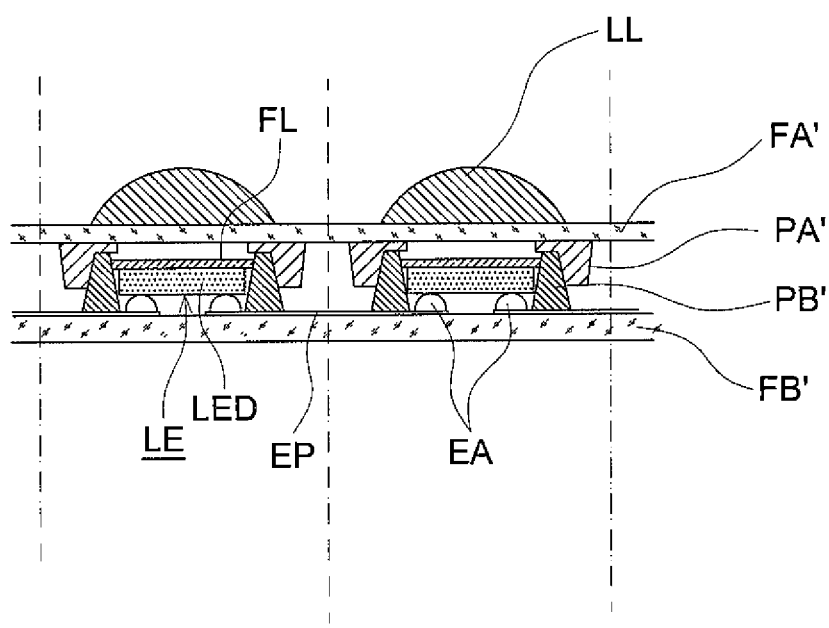
FIG. 5 is a schematic diagram showing a lamination optical function element sheet formed by a second embodiment

Next, the second embodiment of the present invention will be described. As shown in FIG. 5, in the lamination optical function element sheet formed in the second embodiment, a condenser lens LL is formed on the obverse surface of a transparent base film FA', and a fitting portion PA7 to be fitted with a base film FB' is formed on the reverse surface of the transparent base film FA'. On the other hand, a fitting portion PB' to be fitted with the base film FA' is formed on the obverse surface of the base film FB' being a white reflective sheet. On the obverse surface of the base film FB', an electrode EP to supply electricity to a light emitter LE mentioned below is formed previously, and the fitting portion PB' is disposed at a predetermined position above this electrode.

The fitting portion PA' and the fitting portion PB' are each an annular protrusion, and the inside diameter of the fitting portion PA' is made to approximately conform to the outer diameter of the fitting portion PB'. Both the fitting portion PA' and the fitting portion PB' are brought in contact with each other and fit in with each other, whereby the base film FA' and the base film FB' are laminated and boded with each other.

The light emitter LE is formed in the fitting portion PB'. The light emitter LE is constituted such that a light emitting diode LED is bonded on the electrode EP with an electro-conductive adhesive EA and a fluorescent paint FL is coated and hardened on the light emitting diode LED. When electricity is supplied to its cathode and anode, the light emitting diode LED emits light. For example, in the case where a blue light emitting diode is employed as the light emitting diode LED and a YAG type phosphor is used as the fluorescent paint, light over from red to green obtained as fluorescence and blue light having transmitted through the fluorescent paint are mixed with each other, thereby obtaining white light emission.

When the lamination optical function element sheet shown in FIG. 5 is completed, the element sheet is cut out at each position indicated with a two-dot chain line so as to produce separate light emitters. This light emitter is configured to collect light emitted from the light emitter LE by the condenser lent LL and to be able to emit light with strong directivity. Further, light emitted from the back side of the light emitter LE is subjected to white diffusion by the base film FB' and is diffused reflected toward the condenser lens LL so as to contribute to increase a light amount of emitted light fluxes.

In the embodiment shown in FIG. 5, an optical function element is not formed in the reverse surface side of the base film FB'. However any other optical function element may be formed also if needed. For example, the base film FB' is made a transparent sheet, and it is possible to form a recursive reflective element on its reverse surface side.

As the material of the base film, plastic and glass sheet may be used. Further, the material of the fitting portions PA' and PB' may be plastic, and may also be a sealing glass with a low melting point. In the case of use of a sealing glass with a low melting point, the sealing glass is made in the form of a high viscosity slurry or clay of a turbid liquid, and is coated on a base film, and the coated layer is molded by being applied with a roll die, or the coated layer is shaped via transfer of a molded shape by a mold or printing. After lamination, the sealing glass is heated and solidified.

Description will be given for a process for forming a lamination optical function element sheet in the above-mentioned second embodiment. However, since the forming process may be attained by modification of the second embodiment in some degree, the description will be given with reference to FIG. 1.

First, the first optical function element sheet forming process to form optical function elements on the both obverse and reverse surfaces of a first base film FA' may be the same as that of the first embodiment. Then, the first obverse surface molding roll die 3A is used as a die to form a fitting portion PA', and the first reverse surface molding roll die 8A is used as a die to form a condenser LL.

Meanwhile, since only the second reverse surface molding roll die 8B is used as the second optical function element sheet forming process, the process using the second obverse surface molding roll die 3B is omitted. Further, as the second base film FB', used is a film that is a white sheet and on the surface of which an electrode EP shown in drawing 5 is provided beforehand. On this second base film FB', a fitting portion PB' is fabricated by the second reverse surface molding roll die 8B.

On a flat conveyance passage at the downstream side of the process of the fabrication of the fitting portion PB', disposed is an industrial robot to perform chip-on of a light emitter LE prepared previously, whereby the light emitter LE is put in the fitting portion PB. Before the chip-on of the light emitter LE, an electro conductive adhesive EA is applied to two positions on the bottom of the light emitter LE, and then the light emitter LE is pressed on the fitting portion PB' so as to be bonded to it. Such an industrial robot is widely used in the semi-conductor substrate manufacturing field and the like. In the case where the industrial robot is used in the second embodiment of the present invention, the industrial robot may be applied with necessary modification.

The above-mentioned first optical function element sheet forming process and second optical function element sheet forming process are performed simultaneously, and then, in the lamination bonding process, fitting portions PA' and PB7 formed on two base films are fit in and bonded with each other.

As described above, in the present invention, as optical function elements other than the lens, optical function elements in various configurations may be formed, and as the method for fabricating them, "molding", "shaping", and "printing" may be employed.

The "shaping" is employed in the above-mentioned embodiment. However, in the case of "molding", resin is softened by heating, and the softened resin is injected in a roll die, and molded by heat and pressure. Further, in the case of "printing", the roll die is made in a concave plate. Then, an ink is put in the concave on the die, and the die is pressed onto a base film so as to transfer the ink on it. With regard to the fabricating method, needless to say, different methods may be employed for an obverse surface side and a reverse surface side.

The roll die in the above-mentioned enforcement is not limited to the type in which a transfer section on an outer periphery is made of metal, and includes types in which a transfer surface made of resin is formed on an outer periphery of a cylindrical base material.

In the known roll dies used in the above-mentioned embodiment, the transfer section on the outer periphery surface is made of metals such as aluminium, brass, and steel, or resins such as silicon resin, polyurethane resin, epoxy resin, ABS resin, fluororesin, and polymethyl pentene resin, and is shaped in a desired configuration by a cutting process, a nickel electroforming process, or the like. However, in order to shape the entire surface of a roll die by the cutting process, or the nickel electroforming process, there is a problem that it needs a lot of processing time. Further, in the case where the transfer section is used for transfer of a lens surface, the surface to be formed on a roll surface becomes a non rotary symmetrical configuration. That is, the surface becomes a complicated free curved surface configuration different between the rotation axial direction and a circumferential direction on the roll surface, and there is also a problem that it is necessary to use a high precision and expensive processing machine that has a degree of freedom in five axes or more in machine processing and an axis precision of about 1 nm.

Hereafter, description will be given for a roll die producing method and a roll die which solves the above-mentioned problems and is used preferably in an optical function element sheet forming apparatus relating to this embodiment.

FIGS. 6 and 7 are cross-sectional schematic diagrams showing a producing process of a roll die suitably used in the optical function element sheet forming apparatus relating to this embodiment.

First, a flat surface die 120 as shown in FIG. 6 (a) is produced. In the flat surface die 120, on a flat surface die material, a configuration corresponding to a desired optical surface to be fabricated is formed. The drawing shows a condition that a plurality of concave portions 120a each in the form of a concave lens as an optical surface are formed in a two dimensional arrangement with a predetermined interval. The production of this flat surface die can be conducted such that a flat surface die material is shifted for each predetermined interval and subjected to a machining process by lathe turning at each position on which concave portions 120a are formed. Further, since a configuration corresponding to a desired surface configuration to be fabricated is formed on a flat surface, an optical surface configuration is rotation symmetry, unlike the case where non rotation symmetry free curved surfaces are formed on a cylindrical surface of a roll. Accordingly, the production can be made in a short time, and correction processing for the produced configuration can be conducted easily.

Figure 6A:
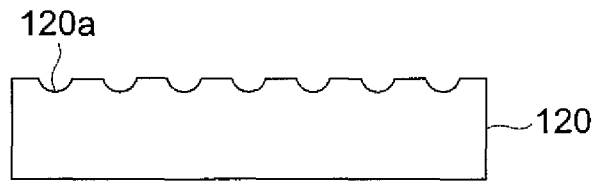
FIG. 6 is a cross-sectional schematic diagram showing a producing process of a roll die suitable to be used for an optical function element sheet forming apparatus according to the present embodiment.
Figure 6B:
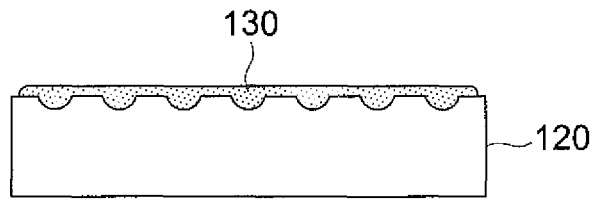

Subsequently, as shown in FIG. 6(b), a melted energy curable resin 130 is dropped onto the flat surface type 120. The term "dropping" in this patent application includes coating and the like. Further, the energy curable resin means any one of ultraviolet curable resin, heat curable resin, and electron ray curable resin.

Further, after production of the flat surface die 120, it is desirable to apply a die-releasing treatment to the flat surface type 120 before the process of dropping the energy curable resin 130 onto the flat surface type 120. With the application of the die-releasing treatment, at the time of adhesion of an energy curable resin adhere to a base material of a below-mentioned roll die, a mold-release characteristic between the energy curable resin and the flat surface die can be improved.

Figure 6C:
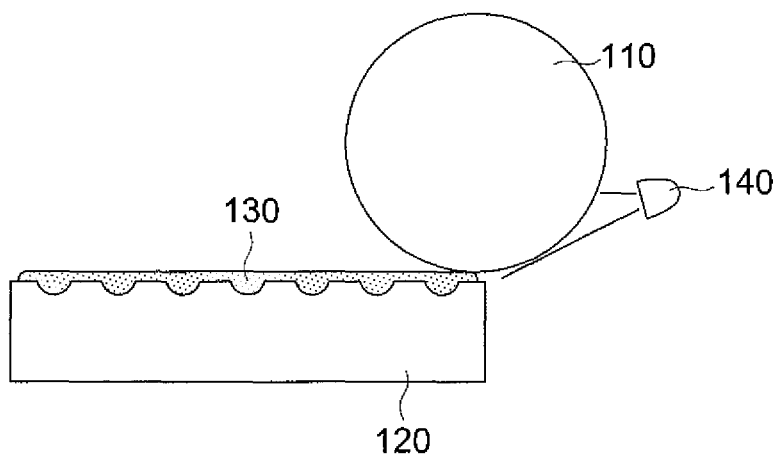
Figure 6D:
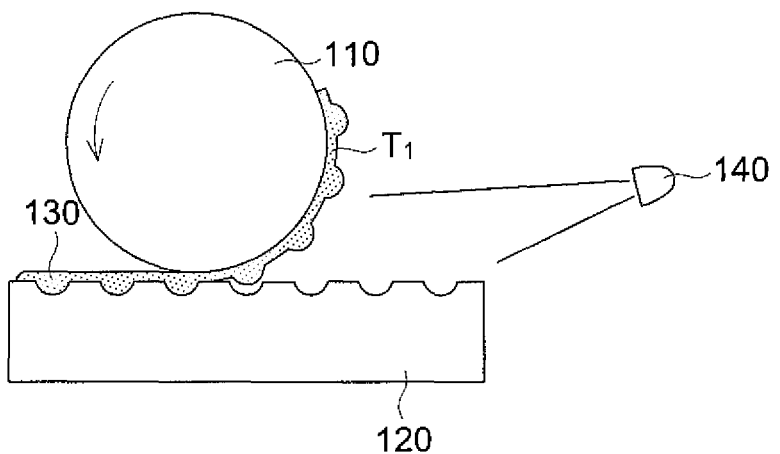

Subsequently, as shown in FIG. 6(c), the base material 110 of a cylindrical roll die is placed on one end of the flat surface die 120, and is rolled leftward as shown in FIG. 6(d).

At this time, the surface of the base material 110 is applied with a $SiO_2$ coat, and thereafter is desirably subjected to a silane coupling treatment. The $SiO_2$ coat may be formed by a thin film forming method, for example, evaporation or atmospheric-pressure plasma. In addition, as another method, molten solvent such as polysilazane is coated and the resulting coatingis dried and sintered, thereby forming the $SiO_2$ coat. Further, on this SiO2 coat, a silane coupling agent is coated. The silane coupling agent includes a Si—OH group. Accordingly, the silane coupling agent forms a strong. Si—O—Si bond for a $SiO_2$ layer on the surface of the base material via a dehydrating condensation reaction. Simultaneously, for a resin, since the silane coupling agent has an OH group, the agent easily bonds with hydrocarbon of the resin and exhibits a strong bond. In this way, as an interlayer between $SiO_2$ and resin, the silane coupling agent bonds strongly with both of them, thereby enhancing the adhesiveness for the resin material and the base material. As a result, at the time of formation of a transfer configuration by rolling, the silane coupling agent promotes the die-release of the energy curable resin from the flat surface die.

In this way, the adhesiveness at the time of adhesion of an energy curable resin to the base material 110 of a roll die can be enhanced.

Further, at this time, curing energy for curing the energy curable resin 130 is supplied from a curing energy supply section 140. This curing energy is supplied to a part where the base material 110 comes closest to the flat surface type 120. That is, as shown in the drawing the curing energy is supplied intensively from the direction that the energy curable resin 130 becomes an outer surface side when being peeled off from the flat surface die 120. As energy for curing, in the case where the energy curable resin 130 is an ultraviolet curable resin, for example, ultraviolet radiation by a chemical lamp for chemical reactions, a mercury lamp, and the like is used. In the case where the energy curable resin 130 is a heat curable resin, for example, infrared light by a YAG laser, a CO2 (carbon dioxide gas) laser, and the like is used. Further, in the drawing, the curing energy supply section 140 is fixed. However, the curing energy supply section 140 may be constituted so as to move in association with the rolling motion of the base material 110.

Thus, as shown in FIG. 6(d), by rolling the base material 110 on the flat surface die 120 while supplying curing energy to the energy curable resin 130, the energy curable resin 130 dropped on the flat surface die 120 is cured while adhering and winding around the periphery of the base material 110. With this, a transfer surface T1 made of resin can be formed on the peripheral surface of the cylindrical base material.

Figure 7A:
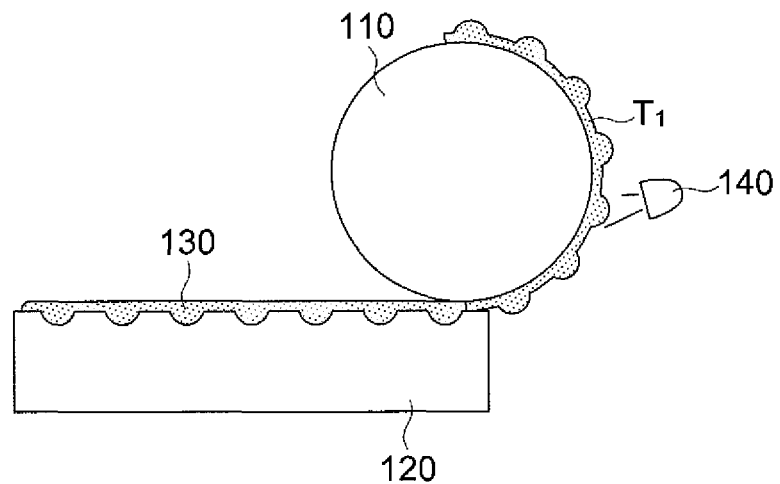
FIG. 7 is a cross-sectional schematic diagram showing a producing process of a roll die suitable to be used for an optical function element sheet forming apparatus according to the present embodiment.
Figure 7B:
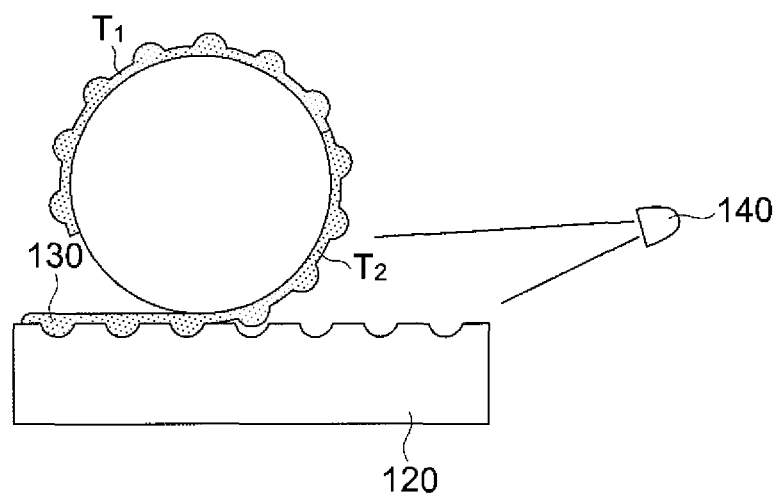

Subsequently, as shown in FIG. 7(a), the energy curable resin 130 is dropped in the same way on the same flat surface die 120 which is subjected to die-releasing treatment if needed, and a portion of the base material 110 on which the transfer surface has not yet formed is placed on one end of the flat surface die 120, and rolled leftward in a similar manner shown in the drawing. With this, as shown in FIG. 7(b), the energy curable resin 130 dropped on the fiat surface die 120 is cured while winding around the surface of the base material 110 on which the transfer surface is not formed, whereby a transfer surface T2 similar to the transfer surface T1 is formed.

Thus, the transfer surface made of resin is formed on the entire periphery, in the circumferential direction, of the base material 110.

Figure 8:
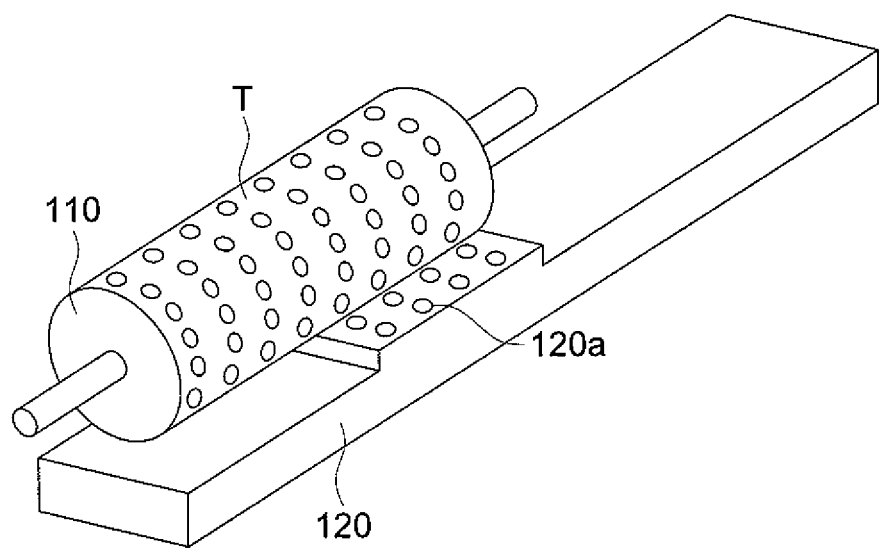
FIG. 8 is a perspective view showing an example of constitution at the time of manufacture of a roll die.

FIG. 8 is a perspective view showing an example of constitution at the time of production of a roll die.

As shown in FIG. 8, on the flat surface die 120, concave portions 120a each shaped in an optical surface are formed in a two dimensional arrangement at a predetermined interval only on a region corresponding to a part of a transfer surface to be formed on the base material 110. An energy curable resin is dropped onto this region, and the base material 110 is rolled on the flat surface die 120 such that a transfer surface by the energy curable resin 130 is formed on a part of the peripheral surface of the base material. As shown in FIGS. 6 and 7, by repetition of this action, the transfer surface T made of resin is formed on the entire periphery surface of the base material 110 in the circumferential direction.

A level difference is formed on the flat surface die 120 as shown in the drawing. With regard to the axial direction of the base material 110, after the formed transfer surface is shifted upward to an extent not to interfere the flat surface die 120, the base material 110 is shifted in the axial direction relative to the flat surface die 120. Successively, the base material 110 is placed again, whereby a transfer surface can be formed on a portion of the base material 110 on which the transfer surface is not formed. With this, the transfer surface T can be formed all over a requested region on the outer periphery surface of the base material 110 while avoiding interference between the transfer surface having already formed on the base material 110 and the flat surface die 120.

Further, it is desirable to form a hardening layer on the surface of the transfer surface T formed in this way on the base material 110. The hardening layer formed on the transfer surface T enables to prolong the life of the transfer surface T serving as a die. As the hardening layer, for example, a high-hardness thin film, such as DLC (diamond-like carbon), is made to adhere by ion plating or the like.

In this connection, in this example, description is made for the case where the transfer surface is formed on the entire periphery surface in the circumferential direction by division of the circumferential direction into two. However, the present invention is not limited to this example. For example, the transfer surface may be formed by division of the entire periphery surface into three or more. The axial direction is the same with the circumferential direction.

Namely, a configuration corresponding to an optical surface configuration to be molded is formed on a flat surface die, and a resin layer is transferred from the flat surface die to a base material and cured while adhering on the base material, whereby it is not necessary to form a transfer surface being a complicated free-form surface on a cylinder. Further, the rotationally-symmetrical configuration in a flat state is made to wind, whereby the complicated free-form surface can be formed easily on the roll surface. This is especially effective in the case where the optical surface configuration to be molded is an aspheric surface.

Furthermore, at the time of formation of a transfer surface to be formed on the base material, it is not necessary to conduct processing over the entire surface of the cylindrical surface, and it is enough only to form a region corresponding to a part of the transfer surface to be formed on a roll die on a flat surface die. Accordingly, it becomes possible to shorten the processing time for the flat surface die. In the process to form a roll die by rolling from the flat surface die, the rotation accuracy of the roll die and the action to shift in the axial direction can be achieved with an accuracy of about 1 to 2 even by use of a general-purpose working machine. Accordingly, complicated procedures by an expensive processing machine become unnecessary. In addition, this flat surface die can be used multiple times at the time of formation of a transfer surface onto a roll surface. Accordingly, the processing time for the flat surface die can be shortened remarkably to one to some tens.

If the first obverse surface molding roll die 3A, the second obverse surface molding roll die 3B, the first reverse surface molding roll die 8A, and the second reverse surface molding roll die 8B are produced by the above producing methods, a high precise transfer configuration can be formed easily regardless of the transfer configuration of a transfer surface to be formed on the outer periphery surface of the base material 110.

Figure 9:
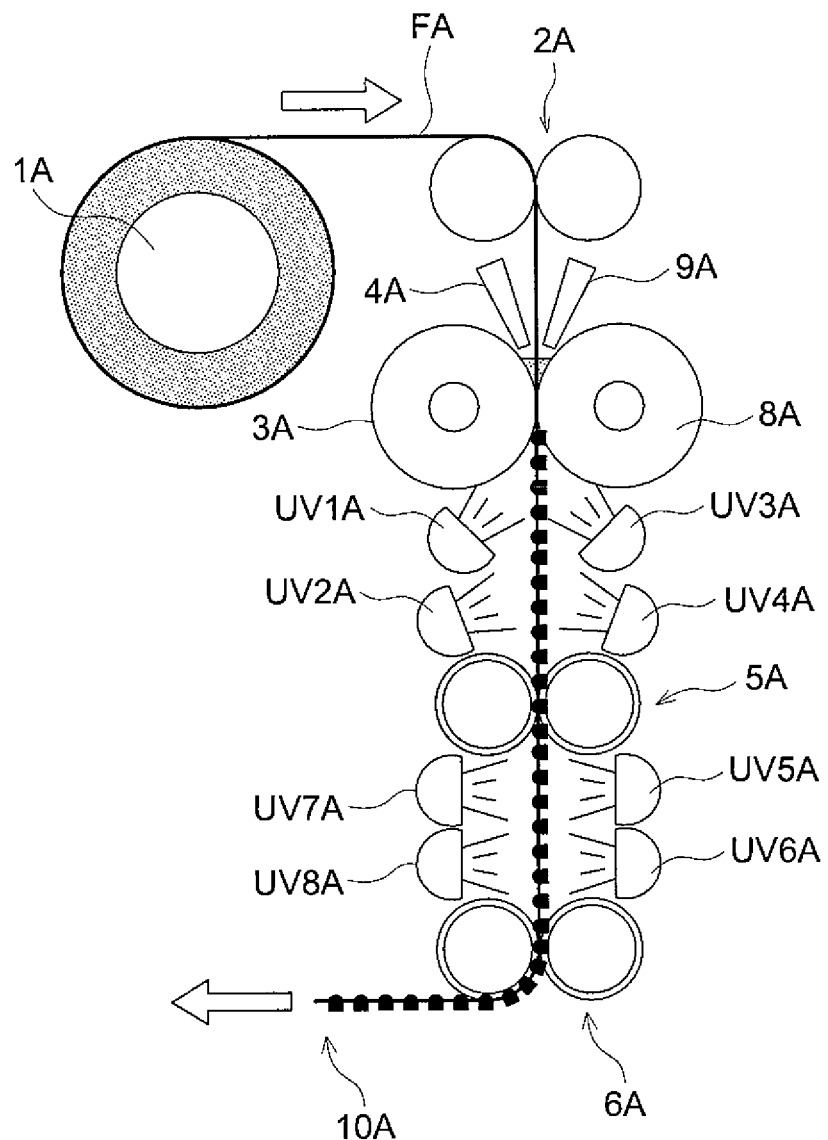
FIG. 9 is a schematic diagram showing the other example of the first optical function element sheet forming process of the lamination optical function element sheet forming apparatus shown in the first embodiment.

FIG. 9 is a schematic diagram showing another example of the first optical function element sheet forming process of the lamination optical function element sheet forming apparatus shown in the first embodiment.

In FIG. 9, the first base film FA is wound around the first base film supply roller 1A, and is pulled out as indicated with an arrowed line. On a conveyance passage of a first base film FA, disposed are in this order a conveying roller pair 2A, a first obverse surface molding roll die 3A and a first reverse surface molding roll die 8A which are horizontally arranged so as to face each other, an ultraviolet curable resin supply section 4A which supplies ultraviolet curing resin between the upstream side of the first obverse surface molding roll die 3A and the first base film FA, an ultraviolet curable resin supply section 9A which supplies ultraviolet curing resin between the upstream side of the first reverse surface molding roll die 8A and the first base film FA, a conveying roller pair 5A, and a conveying roller pair 6A.

A heater is disposed in the inside of each of the first obverse surface molding roll die 3A and the first reverse surface molding roll die 8A, and is constituted so as to control the temperature of ultraviolet curing resin at constant temperature.

The ultraviolet curing resin supplied between each of the first obverse surface molding roll die 3A and the first reverse surface molding roll die 8A and the first base film FA is cured by being irradiated by ultraviolet irradiation lamps UV1A, UV2A, UV3A, UV4A, UV5A, UV6A, UV7A, and UV8A which are arranged at the both sides of the conveyance passage.

Here, the respective pairs of the first obverse surface molding roll die 3A and the first reverse surface molding roll die 8A, the conveying roller pair 5A, and the conveying roller pair 6A are horizontally arranged so as to face each other and aligned sequentially in the vertical direction. Further, all of them are driven at a constant speed.

Before start of formation, the first obverse surface molding roll die 3A and the first reverse surface molding roll die 8A are subjected to adjustment with which the interval between them, and the respective positions of the dies in terms of longitudinal direction (circumferential direction) and transverse direction (axial direction) are adjusted precisely. With this adjustment, optical elements formed on the obverse surface and reverse surface can be formed without misalignment.

In FIG. 9, the conveying roller pairs 5A and 6A may be each a roller which is configured not to come in contact with optical elements, but to come in contact with portions between optical elements as shown in FIG. 2. In FIG. 9, for the conveying roller indicated with a double circle, a grooved roller or a recessed roller is employed.

With the constitution that an optical element sheet is pinched and conveyed in the vertical direction by use of a conveying roller pair which does not come in contact with optical elements, but come in contact with portions between optical elements, when the optical element sheet is gradually cured on the fast base film FA, since the optical element sheet is applied with tension by the conveying force of the conveying roller pair in addition to its weight, the optical element sheet can be cured without causing warpage.

The distance in the vertical direction from both of the first obverse surface molding roll die 3A and the first reverse surface molding roll die 8A to the conveying roller pair 6A is made longer the distance required to thoroughly cure the resin. Accordingly, although the distance depends on the used resin material and the size of the optical element, the distance may be 3 m or more in general.

In the above descriptions, it is presupposed that a roll die is prepared precisely and there exists neither eccentricity in axis nor variation in a roller configuration. However, it may be difficult to make these eccentricity and variation zero. Accordingly, in the case of combination of a lens and a stop or formation of lenses on both surfaces, the eccentricity between an obverse-side optical lens and a reverse-side optical lens may cause problems. In these cases, their influences become large. Accordingly, in order to minimize the influences, the following counter measures may be recommended. The eccentricity in axis and roll configuration in both roll dies are measured beforehand, and the measurement values are stored. Then, the speed of each of the roll dies may be corrected based on the eccentricity measurement values and the roll configuration measurement values. At this time, the rotational position information of each of the roll dies is needed. Accordingly, as shown in FIG. 4, a mark is provided on each of the obverse surface molding roll die 3 and the reverse surface molding roll die 4, and a sensor is disposed so as to detect the mark. Alternatively, a rotary encoder is disposed on the shaft so as to obtain the rotational position information.

As shown in FIG. 9, in the first optical function element sheet forming process, the first obverse surface molding roll die 3A and the first reverse surface molding roll die 8A are disposed respectively at the same position on the obverse and reverse sides of the first base film FA such that obverse side optical functional elements and reverse side optical functional elements are molded simultaneously. With this constitution, the lamination optical function element sheet forming apparatus may be constituted in a more compact size.

DESCRIPTION OF REFERENCE SIGNS

1A First base film supply roller
1B Second base film supply roller 2A, 2B, 5A, 5B, 6A, 6B, 10A, 10B, and 21 Conveying roller pair
3A First obverse surface molding roll die
3B Second obverse surface molding roll die
8A First reverse surface molding roll die
8B Second reverse surface molding roll die
4A, 4B, 9A, and 9B Ultraviolet curable resin supply section
7A and 7B Mark detecting section for positioning between obverse and reverse surfaces
13B Position-changeable conveying roller
22 Heating roller
23 Spacer sheet supply roller
24 Conveying roller
Backup roller
26 Molded-product roller
27A and 27B Mark detecting section for positioning lamination
110 Base material
120 Flat surface die
120a Concave portion
130 Energy curable resin
140 Curing energy supply section
T, $T_1$, $T_2$ Transfer surface
FA and FA' First base film
FB and FB' Second base film
S Spacer sheet
M Die section for forming marks
UV1A to UV8A and UV1B to UV8B Ultraviolet irradiation lamp
L1, L2, L3, L4, and LL Lens
PA, PB, PA', and PB' Fitting portion
LE Light emitter
LED Light emitting diode
EP Electrode
EA Electro-conductive adhesive
FL Phosphor

The invention claimed is:

1. A method for continuously forming a lamination optical function element sheet, comprising:
a first optical function element sheet forming process for molding, shape-forming or printing optical function elements on one surface of a first base film by use of a first roll die, and molding, shape-forming or printing optical function elements on another surface by use of a second roll die;
a second optical function element sheet forming process for molding, shape-forming or printing optical function elements on at least one surface of a second base film by use of a third roll die; and
a lamination bonding process for allowing both of the first optical function element sheet forming process and the second optical function element sheet forming process to proceed simultaneously, and laminating and bonding the formed first optical function element sheet and the formed second optical function element sheet, thereby forming a lamination optical function element sheet.

2. The method described in claim 1, wherein the formation of the optical function elements onto one surface or another surface of the first base film or at least one surface of the second base film is performed such that an ultraviolet curable resin is supplied to the roll die and the ultraviolet curable resin is cured by ultraviolet.

3. The method described in claim 2, wherein the bonding of the first optical function element sheet and the second optical function element sheet is performed such that the formed optical function elements are laminated to each other in a semi-cured state, and then curing is completed.

4. The method described in claim 2, wherein the ultraviolet curable resin used for the formation of the optical function elements includes a blended compound of a photo-polymerization initiator and a thermal polymerization initiator, wherein the ultraviolet curable resin is made in a semi-cured state by irradiation of ultraviolet, and is finally cured by heating at the time of lamination bonding.

5. The method described in claim 2, wherein as the ultraviolet curable resin used for the formation of the optical function elements, a delayed-curing type ultraviolet curable resin is used.

6. The method described in claim 2, wherein the ultraviolet curable resin is one of urethane acrylate, epoxy acrylate, and unsaturated acid polyester.

7. The method described in claim 1, wherein the formation of the optical function elements onto one surface or another surface of the first base film or at least one surface of the second base film is performed such that heat curable resin is supplied to the roll die and the heat curable resin is cured by heating.

8. The method described in claim 7, wherein the bonding of the first optical function element sheet and the second optical function element sheet is performed such that the formed optical function elements are laminated to each other in a semi-cured state, and then curing is completed.

9. The method described in claim 7, wherein the heat curable resin is one of diethylene glycol diallyl carbonate, and siloxanyl methacrylate.

10. The method described in claim 1, wherein contact portions which come in contact with each other at a time of lamination of the first optical function element sheet and the second optical function element sheet are fitting-portions formed on respective outer peripheries of the optical functional elements, and the fitting-portions are made into one body at a time of formation of the optical functional elements.

11. The method described in claim 1, wherein contact portions which come in contact with each other at a time of lamination of the first optical function element sheet and the second optical function element sheet are fitting-portions each formed by an annular protrusion, and the fitting-portions are fit to each other such that an inner side of one of the fitting-portions is fit to an outer side of the other one.

12. The method described in claim 1, wherein each of the first roll die and the third roll die includes a die section to form a position detection mark, and alignment between the optical function elements formed on one surface of the first base film and the optical function elements formed on another surface of the first base film is performed by detecting the position detection mark formed by the first roll die, and alignment between the optical function elements formed on the first base film and the optical function elements formed on the second base film is performed by detecting both of the position detection mark formed by the first roll die and the position detection mark formed by the third roll die.

13. A lamination optical function element sheet forming apparatus, comprising:
a first base film supplying section;
a first optical function element forming section for molding, shape-forming or printing a plurality of optical function elements on one surface of a first base film supplied from the first base film supplying section by use of a first roll die having dies for forming the plurality of optical function elements;
a second optical function element forming section for forming a first optical function element sheet by molding, shape-forming or printing a plurality of optical function elements on another surface of the first base film supplied from the first base film supplying section by use of a second roll die having dies for forming the plurality of optical function elements;

a second base film supplying section;

a third optical function element forming section for forming a second optical function element sheet by molding, shape-forming or printing a plurality of optical function elements on one surface of a second base film supplied from the second base film supplying section by use of a third roll die having dies for forming the plurality of optical function elements; and a lamination bonding section for forming a lamination optical function element sheet by laminating and bonding the first optical function element sheet on obverse and reverse surfaces of which the optical function elements are formed by the first optical function element forming section and the second optical function element forming section and the second optical function element sheet on which the optical function elements are formed by the third optical function element forming section.

14. The forming apparatus described in claim 13, wherein the first optical function element forming section, the second optical function element forming section, or the third optical function element forming section supplies ultraviolet curable resin to the first roll die, the second roll die or the third roll die, and cures the ultraviolet curable resin with ultraviolet.

15. The forming apparatus described in claim 14, wherein bonding of the first optical function element sheet and the second optical function element sheet is performed such that the formed optical function elements are laminated in a semi-cured state, and then curing is completed.

16. The forming apparatus described in claim 13, wherein formation of optical function elements onto one surface or another surface of the first base film or at least one surface of the second base film is performed such that heat curable resin is supplied to a roll die and the heat curable resin is cured by heating.

17. The forming apparatus described in claim 16, wherein bonding of the first optical function element sheet and the second optical function element sheet is performed such that the formed optical function elements are laminated in a semi-cured state, and then curing is completed.

18. The forming apparatus described in claim 13, wherein contact portions which come in contact with each other at a time of lamination of the first optical function element sheet and the second optical function element sheet are fitting-portions formed on respective outer peripheries of the optical functional element, and the fitting-portions are formed integrally with the optical functional element.

19. The forming apparatus described in claim 13, wherein contact portions which come in contact with each other at the time of lamination of the first optical function element sheet and the second optical function element sheet are fitting-portions each formed by annular protrusion, and the fitting-portions are fit to each other such that an inner side of one of the fitting-portions is fit to an outer side of the other one.

20. The forming apparatus described in claim 13, wherein the first roll die and the third roll die each includes a die section to form a position detection mark, and alignment between optical function elements formed on one surface and another surface of the first base film is performed by detecting the position detection mark formed by the first roll die, and alignment between the optical function elements formed on the first base film and the optical function elements formed on the second base film is performed by detecting the position detection mark formed by the first roll die and the position detection mark formed by the third roll die.

21. The forming apparatus described in claim 13, wherein in at least one of the first roll die, the second roll die, and the third roll die, a transfer surface is formed on a cylindrical roll surface which becomes a base material with ultraviolet curable resin or a heat curable resin.

* * * * *